Patented Apr. 3, 1923.

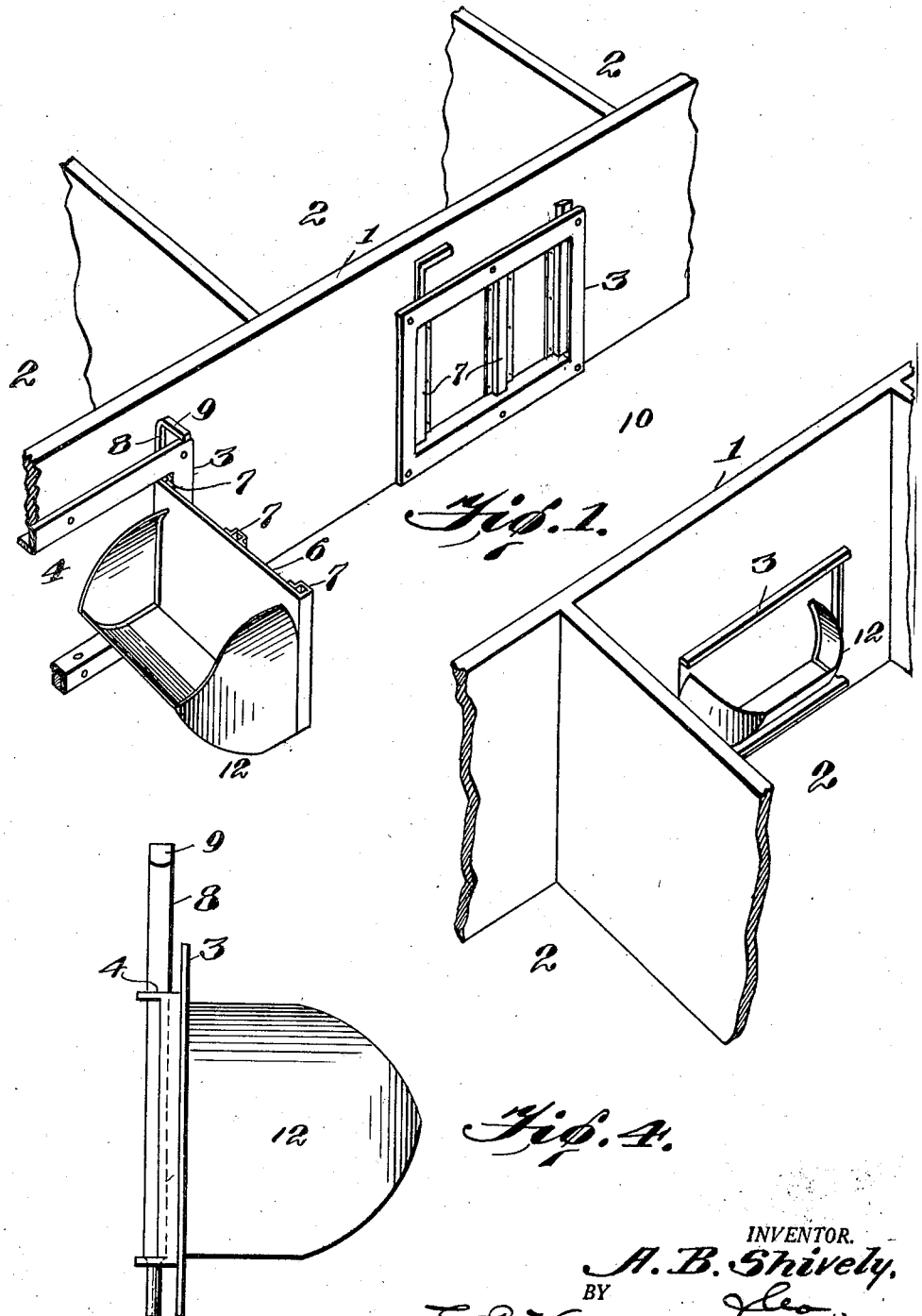

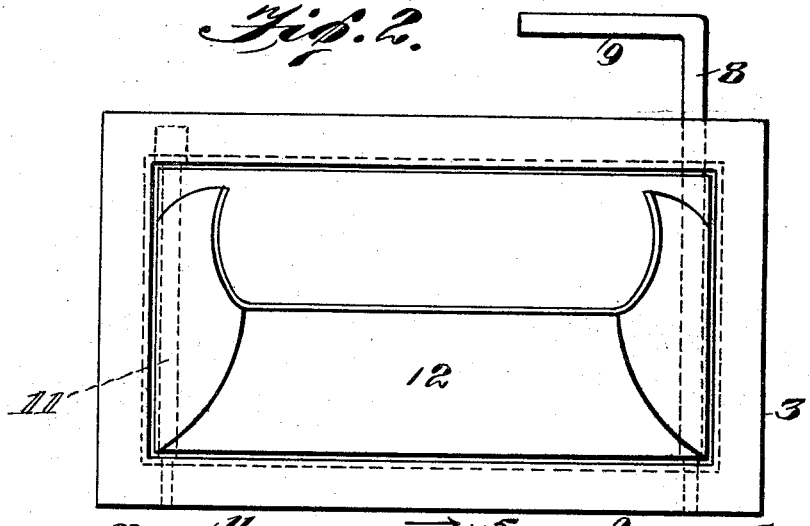
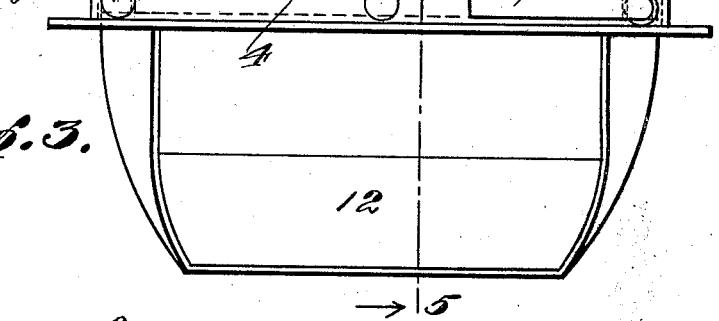
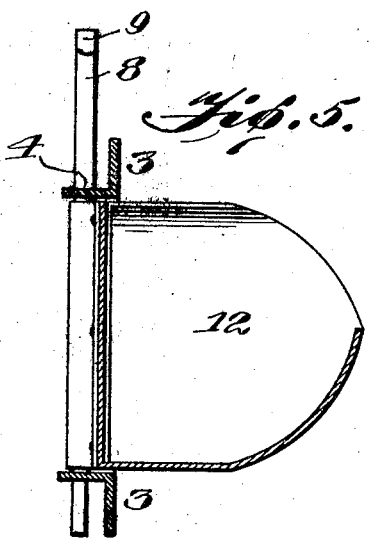
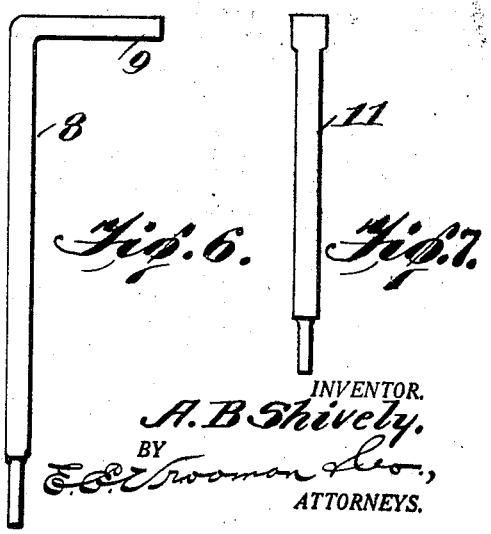

1,450,519

UNITED STATES PATENT OFFICE.

ALBERT B. SHIVELY, OF LAUREL, NEBRASKA.

HOG-TROUGH APPARATUS.

Application filed December 1, 1922. Serial No. 604,329.

*To all whom it may concern:*

Be it known that I, ALBERT B. SHIVELY, a citizen of the United States, residing at Laurel, in the county of Cedar and State of Nebraska, have invented certain new and useful Improvements in Hog-Trough Apparatus, of which the following is a specification, reference being had therein to the accompanying drawings.

This invention relates to a hog trough apparatus, and the object of the invention is the construction of a simple and efficient hog trough apparatus which can be readily accessible from an aisle, or which can be positioned so as to give a relatively clear opening for little pigs to run back and forth from a pen or an aisle, or vice versa.

Another object of the invention is to simplify and improve upon the structure disclosed in my prior United States application, Serial No. 567,297, "hog watering trough."

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a fragmentary, perspective view of a hog house showing a plurality of pens or stalls and an aisle, with my hog apparatuses in position.

Figure 2 is a view in front elevation of a device constructed in accordance with the present invention, while Figure 3 is a top plan view of the same.

Figure 4 is an end view of the device.

Figure 5 is a sectional view, taken on line 5—5, Fig. 3, and looking in the direction of the arrows.

Figure 6 is a view in side elevation of the operating shaft.

Figure 7 is a view in side elevation of the locking shaft.

Referring to the drawings by numerals; upon the front 1, of each pen 2, is formed my apparatus; the front 1 constitutes a support, and I use this term in my claims, hereinafter set forth. Secured to the front 1 is an angle iron frame 3 (see Fig. 5). This frame 3 registers with an opening 4 in the front 1, and is secured therein in any suitable manner.

A plate-like gate 6 is provided for closing each opening 4, and on the outside of the gate 6, and arranged in vertical position, are a plurality of hollow casings 7. Each casing 7 extends the full height of the gate (Fig. 1). A shaft 8 extends through the angle frame 3, as well as through one of the casings 7, and when the operator grasps the handle 9 the gate may be swung into the pen 2, or outwardly into the aisle 10, Fig. 1.

A locking shaft 11 is used to prevent the hogs from turning the gate upon the shaft 8. This shaft 11 extends through the frame 3 and also through one of the casings 7.

A trough 12 is attached to one side of the gate 6 and may be swung out into the aisle 10 by removing locking shaft 11 and rotating the operating shaft 8.

When the operating shaft 8 is placed in the center of frame 3 and in the middle of casing 7 the gate 6 can be freely rotated within the opening 4. When the operating shaft 8 is in either one of the end casings 7 the gate, with the trough attached thereto, can be swung to one side of the opening 4, leaving practically the entire opening free to allow of little pigs to run back and forth between the pen and the aisle.

Further, reference may be had to the specification of my prior United States application, Serial No. 567,297, for a further illustration of the principle of my inventions.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In an apparatus of the class described, the combination with a support provided with an opening, of a gate provided with a trough contiguous to said opening and normally closing the same, means for pivotally mounting said gate in a plurality of places upon said support, and means for locking said gate against pivotal movement.

2. In an apparatus of the class described, the combination with a support provided with an opening, of a frame secured to said support around said opening, a gate with a trough in said frame and closing said opening, and means for pivotally mounting said gate in a plurality of places upon said frame.

3. In an apparatus of the class described, the combination with a support provided with an opening, of a gate provided with a trough and with a plurality of hollow casings, operating means carried by said support and in one of said casings, and locking means carried by said support and in another of said casings of the gate.

4. In an apparatus of the class described, the combination with a support provided with an opening, of a gate for closing said opening, said gate provided on one side with a trough and on its other side with a plurality of vertical hollow casings extending the full height thereof, an operating shaft carried by said support and extending through one of said vertical casings, and a locking shaft carried by said support and extending through another one of said vertical casings.

5. In an apparatus of the class described, the combination with a support provided with an opening, of an angle frame secured to said support around said opening, a plate-like gate closing said opening and positioned within the angle frame, a trough secured to one side of said gate, a series of vertical hollow casings secured to the other side of said gate, an operating shaft rotatably mounted in said angle frame and extending through one of said casings, and a locking shaft in one of said casings and extending through portions of said angle frame.

In testimony whereof I hereunto affix my signature.

ALBERT B. SHIVELY.